Nov. 6, 1956     T. W. HALLERBERG ET AL     2,769,890

HEAT CONTROLLER

Filed May 25, 1954

INVENTORS
Theodore W. Hallerberg
BY Jacob L. Pauly

Owen & Owen

ATTORNEYS

United States Patent Office 2,769,890
Patented Nov. 6, 1956

2,769,890

HEAT CONTROLLER

Theodore W. Hallerberg, Los Angeles, and Jacob L. Pauly, Inglewood, Calif.; said Pauly assignor to said Hallerberg Application May 25, 1954, Serial No. 432,204

1 Claim. (Cl. 219—20)

This invention relates to time-varied heat controllers and is particularly directed to a controller for use with electrically heated ovens, furnaces, dryers, range units and similar loads.

It has heretofore been proposed to control the temperature of an electrically heated oven by a cycle control by which the heating element is operated through a definite on-off cycle, full voltage being applied during the "on" portion of the cycle and no voltage being applied during the "off" period. This has been accomplished by means of a small motor which drives a switch actuating cam, the circuit to the heating element being controlled by the switch. The cam has been made variable in its angular extent so that the operator can adjust the proportion between the "on" and "off" parts of the cycle and thus determine to some degree the ultimate temperature of the heated element or volume.

Such mechanisms are relatively expensive and have given trouble in service for several reasons, among which are deterioration of the switch contacts due to arcing and the maintenance required by the timing motor.

Common thermostatically controlled switches have also been used, of course, but such devices are unsatisfactory in many instances because they depend for their operation on temperature variation where none is desired. In other words, the temperature must fluctuate above and below the desired value for the usual thermostat to operate.

The present invention has for its primary object to provide a simplified and efficient means to control the relative duration of the "on" and "off" portions of the heating cycle of an electric heating element or similar electric load.

Another object is to provide such a device in which oppositely acting bimetallic elements are used, each of which is positively driven during a respective part of the cycle.

Still another object is to provide in a device of the foregoing character for a simple and efficient means to vary the voltage drop across, and thus the heat developed in, the driver coil for each of the respective bimetallic elements.

Other objects and advantages of the invention will become apparent from the following specification, reference being had to the accompanying drawings, in which.

Figure 1:
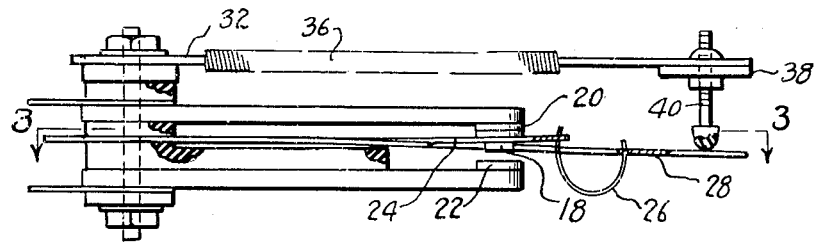
Fig. 1 is a side elevational view of a switch and its associated operating mechanism.
Figure 2:
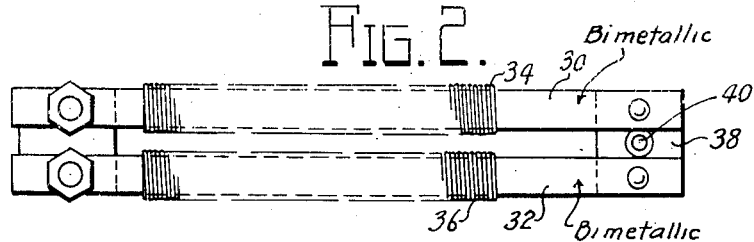
Fig. 2 is a top view thereof.
Figure 3:
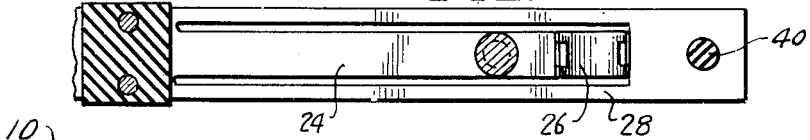
Fig. 3 is a fragmentary section on line 3—3 of Fig. 1.
Figure 4:
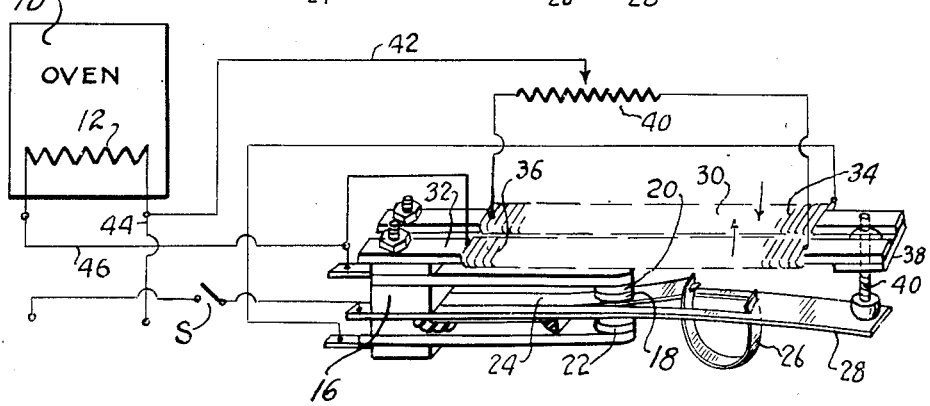
Fig. 4 is a circuit diagram, and a diagrammatic perspective view of the switch and its operating mechanism.

Referring to the drawings, the present invention is there shown as a control for a heating element of an oven 10, in which the electric heating coil or load is designated 12. The power source is indicated at 14 and may comprise the usual 110 and 220 volt line.

The control element itself includes a switch 16 having a movable center contact 18 cooperating with an upper contact 20 and a lower contact 22. The center contact of the double throw switch thus formed is snapped from one position to the other by any suitable mechanism and for this purpose the center contact is carried by a flexible supporting arm 24 mounted in a stationary manner at one end and having its opposite end associated with a C-shaped spring 26. The opposite leg of the spring 26 is connected to a bifurcated leaf 28 which extends on each side of and beyond the arm 24 and has a small lug extending into engagement with the spring. The leaf 28 and spring 26 thus form an over-center mechanism for the arm 24 in a manner well understood in the art, and so arranged that when the leaf 28 is depressed beyond the plane of the arm the spring is compressed and thus forces the switch contact carrying arm 24 upwardly to close a circuit with the upper contact 20, and when the leaf 28 is raised beyond the plane of the arm 24 the spring acts to force the arm down to close a circuit between contacts 18 and 22.

Preferably the leaf 28 is made of spring metal normally standing above the plane of the arm 24, but a separate upwardly acting biasing spring may be used if desired.

Mounted above the double throw snap action switch and preferably carried as a unit therewith is a thermally responsive switch operator comprising a pair of oppositely acting bimetallic arms 30 and 32. Each of the arms is provided with a respective heating coil 34 and 36 and the bimetals are so arranged that an increase in temperature caused by current flow through the driver coil 34 causes the arm 30 to flex downwardly. Conversely, an increase in temperature of the arm 32 caused by current flow through the driver coil 36 causes this arm to flex upwardly.

The arms 30 and 32 are joined at their free ends by a bar 38 and an adjustable operating screw 40 is fixed therethrough and extends down into operating engagement with leaf 28. Thus, heating of the bimetallic arm 30 causes the bar 38 and screw 40 to move downwardly, driving the switch leaf 28 to the position in which the snap acting switch moves to close the upper contact pair 18 and 20. Similarly, heating of arm 32 moves the bar 38 and screw 40 in such a direction that leaf 28 moves above the plane of the center arm and the snap acting double throw switch thus moves quickly to its opposite or lower position in which the circuit is closed through contacts 18 and 22.

Heating coil 34 is connected to contact 22 and heating coil 36 is connected to contact 20. Thus, with the movable switch contact 18 connected to the line or power source, a circuit is completed through one or the other of the heating coils whenever the switch contact 18 snaps from one position to the other.

The heating coils 34 and 36 are also connected to opposite ends of a potentiometer 40 the slider 42 of which is connected to one side of the power source by a conductor 44, the latter being also connected to one side of the electric heating coil or load 12. The opposite side of the coil 12 is connected by conductor 46 to the switch contact 20.

It will thus be seen that, with the movable contact 18 closed against contact 20, two parallel circuits are established, one directly through the load or electric heating coil 12 and the other through the bimetal heating coil or driver coil 36 and the potentiometer 40 in series to conductor 44. The voltage drop through the second named parallel circuit, which may be designated as the control circuit, is, of course, equal to the line voltage, but the portion of this voltage taken in the heating coil 36 will vary in accordance with the position of the potentiometer slider 42. If the slider is at the end of its movement at which none of the resistance of the potentiometer is in series with the coil 36, the entire line voltage is dropped in this coil and its heating effect will be at a maximum. However, if the full resistance of the potentiometer is put in series with coil 36 the voltage drop is at a minimum and the heating effect is likewise at a minimum. Thus, the time required for the associated thermal arm 32 to act on the snap acting switch to cause a change of position thereof can be varied at the will of the operator by changing the setting of the potentiometer. This changes the duration of the "on" portion of the cycle of operation of the load coil 12.

With the double throw switch moved to a position in which contacts 18 and 22 are closed, the circuit to the load is opened, and a circuit is established only through the bimetal driver coil 34 and the potentiometer 40. Here again the heating effect of the coil 34 will depend on the position of the potentiometer slider 42, and can be varied at the selection of the operator to change the duration of the "off" portion of the cycle of the load or heating coil 12.

In operation, a line switch S is closed, and the operator sets the potentiometer to give whatever division is desired between the "off" and "on" parts of the cycle. With the bimetallic elements standing in the normal position with both heating coils 34 and 36 at room temperature the circuit through contacts 18 and 20 is closed so that current flows to coil 36 and to the load circuit. The load coil 12 thus immediately begins to heat under full line voltage. The heat of the coil 36 is transferred to its associated bimetallic element 32 which drives the double throw snap acting switch to the opposite position by moving the leaf 28 upwardly which causes the arm 24 to snap to the down position closing contacts 18 and 22. The load is thus disconnected, but the heating coil 34 is connected which immediately begins to heat its associated bimetal 30. When bimetal 30 is deformed to a predetermined point, the snap action switch moves again to its opposite position in which the load is connected.

By changing the position of the potentiometer slider 42, it has been found that the cycle of the load coil 12 can be varied from 95% on—5% off to 5% on—95% off.

It will be seen that no reliance is placed on the cooling of either of the bimetallic arms 30 or 32 to establish the rate at which the load is turned on or off, since the arms are driven positively at all times, the control resulting has been found to be much more uniform than that obtainable from other forms of time varied controls or from the usual on-off thermostats.

We claim:

Control apparatus for an electric heating circuit comprising a power source, a load coil, a double-throw switch to connect said load coil to said power source periodically, means to actuate said switch comprising, a bimetallic element (30) tending when heated to move said switch to closed position, a first heating coil (34) associated with said bimetallic element, a second bimetallic element (32) tending when heated to move said switch to open position, a second heating coil (36) associated with said second bimetallic element, connections to establish a circuit from said power source through said second heating coil and said load coil in parallel when said switch is in one position, connections to establish a circuit only through said first heating coil when said switch is in its other position, and means to vary the resistance of at least one of said heating coil circuits and thereby vary the relative duration of the cycle of operation of said double-throw switch.

References Cited in the file of this patent
UNITED STATES PATENTS

| 1,684,709 | Lowenstein | Sept. 18, 1928 |
| 1,886,439 | Wells | Nov. 8, 1932 |
| 2,179,811 | Brosseau | Nov. 14, 1939 |
| 2,407,089 | McFall | Sept. 3, 1946 |
| 2,510,040 | Rudahl | May 30, 1950 |
| 2,649,530 | Dietz | Aug. 18, 1953 |